United States Patent [19]
Delap

[11] 3,976,632
[45] Aug. 24, 1976

[54] REACTIVATION OF ORGANOCHROMIUM OLEFIN POLYMERIZATION CATALYST IN PRESENCE OF OXYGEN

[75] Inventor: Joseph A. Delap, Bartlesville, Okla.

[73] Assignee: Phillips Petroleum Company, Bartlesville, Okla.

[22] Filed: Dec. 4, 1974

[21] Appl. No.: 529,580

[52] U.S. Cl. ............................ 526/113; 252/430; 252/431 R; 526/126; 526/348; 526/349
[51] Int. Cl.² .................... C08F 4/02; C08F 4/22
[58] Field of Search .................. 252/430, 431 R; 260/88.2, 93.7, 94.9 D, 94.9 DA

[56] References Cited
UNITED STATES PATENTS

| | | | |
|---|---|---|---|
| 2,825,721 | 3/1958 | Hogan et al. | 260/94.9 D |
| 2,912,421 | 11/1959 | Juveland et al. | 260/94.9 D |
| 3,013,002 | 12/1961 | Breslow et al. | 260/94.9 C |
| 3,014,020 | 12/1961 | Balthis | 260/94.9 D |
| 3,326,871 | 6/1967 | Shepard et al. | 260/94.9 D |
| 3,349,067 | 10/1967 | Hill | 260/94.9 D |
| 3,709,853 | 1/1973 | Karapinka | 260/94.9 DA |

Primary Examiner—Edward J. Smith

[57] ABSTRACT

A particulate catalyst support containing titanium is heated to calcination temperature and thereafter impregnated with a π bonded organochromium compound. Thereafter, the chromium-containing support is reactivated, at least a portion of the reactivation occurring in the presence of oxygen. In one embodiment at least 2 percent solvent is present as the catalyst is reactivated at approximately room temperature. In an alternate embodiment the support is calcined at a temperature within the range of 1450° to 1650°F. Such catalysts are particularly suitable for the production of high melt index polymer from at least one mono-1-olefin containing 2 to 8 carbon atoms per molecule.

31 Claims, 1 Drawing Figure

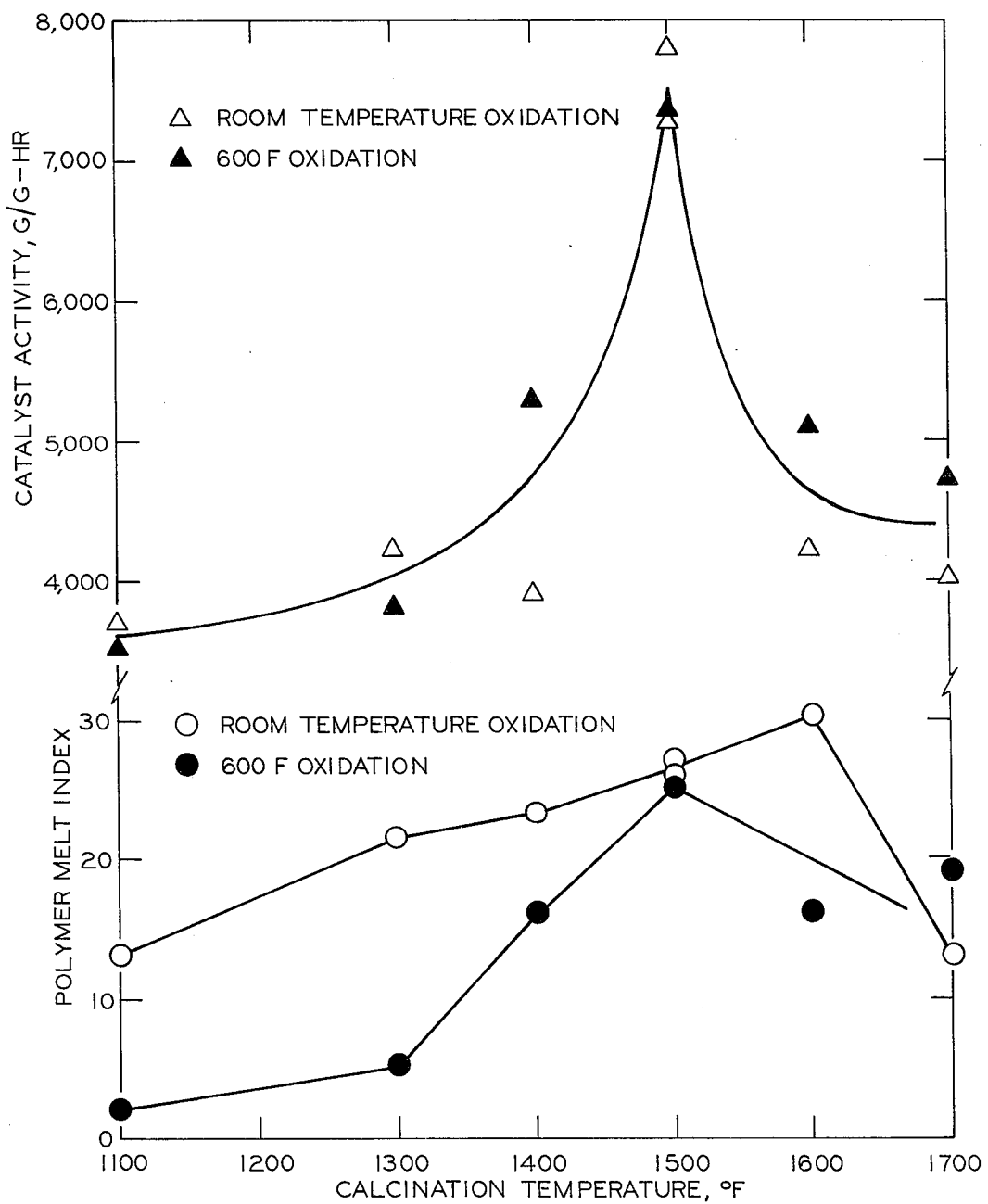

REACTIVATION OF ORGANOCHROMIUM OLEFIN POLYMERIZATION CATALYST IN PRESENCE OF OXYGEN

BACKGROUND OF THE INVENTION

This invention relates to supported titanium-containing organochromium polymerization catalysts.

Supported chromium-containing catalysts can be used to prepare olefin polymers in hydrocarbon solution to give a product having excellent characteristics from many standpoints. Supported chromium-containing catalysts can also be used to prepare olefin polymers in a slurry system wherein the polymer is produced in the form of small particles of solid material suspended in a diluent. This process, frequently referred to as a particle-form process, has the advantage of being less complex. However, one method of controlling the molecular weight of the resulting polymer in the solution process is simply to vary the temperature, with lower molecular weight (higher melt flow) polymer being produced at the higher temperature. It is readily apparent that this type of process control is severely limited in a particle-form process since any substantial increase in the temperature would cause the polymer to go into solution.

BRIEF SUMMARY OF THE INVENTION

It is an object of this invention to provide a catalyst for producing high melt flow polymer in a particle-form process;

it is a further object of this invention to provide a simplified process for producing olefin polymers;

it is yet a further object of this invention to provide an improved method of activating organochromium-containing catalysts; and it is still yet a further object of this invention to provide an improved organochromium-containing catalyst.

In accordance with one embodiment of this invention a particulate base containing titanium is calcined at an elevated temperature, thereafter impregnated with a $\pi$ bonded organochromium compound, and finally subjected to a reactivation step at a temperature of 40°–150°F by contacting same with oxygen while in the presence of at least 2 weight per cent solvent during the entire oxygen treatment. In another embodiment of this invention, a particulate base containing titanium is calcined at 1450° to 1650°F, thereafter impregnated with a $\pi$ bonded organochromium compound, and finally subjected to a reactivation step in the presence of oxygen at a temperature of either 40°–150°F or 500°–800°F.

BRIEF DESCRIPTION OF THE DRAWING

The FIGURE is a plot showing polymer melt index versus calcination temperature of the base prior to introduction of the diarene chromium and catalyst activity versus the calcination temperature.

DESCRIPTION OF THE PREFERRED EMBODIMENTS

Preferred supports are silicon-containing materials such as silica, silica-alumina and other silica-containing particulate supports containing titanium. These supports can be prepared by precipitation and coprecipitation techniques or by mixing silica with other refractory materials. For example, an alkali metal silicate solution such as water glass can be coprecipitated with a titanium compound such as titanyl sulfate or titanium potassium oxalate by adding said silicate to a mineral acid such as sulfuric acid, said acid containing said titanium compound, to form a hydrogel. The hydrogel is preferably aged for a time greater than 1 hour, washed with water to produce a substantially alkali metal-free hydrogel and then treated with a water-soluble oxygen-containing liquid organic compound to effect azeotropic distillation to remove water and form a xerogel. Conventional drying methods such as spray drying from a water suspension, or simply heating a hydrogel cake in an oven may be used. The titanium can be added to a titanium-free support by mixing the support with a solution of a titanium compound or by dry blending with a titanium compound. These same techniques can also be used to impart additional titanium to a coprecipitated titanium-containing cogel. For example, a hydrocarbon solution of titanium acetylacetonate or tetraisopropyl titanate can be used to impregnate the support with titanium. The total amount of titanium in the support prior to calcination is within the range of 0.5 to 10, preferably 1 to 8 weight percent based on the total weight of the support and titanium compound.

This titanium-containing base is then calcined (activated) in air at an elevated temperature. In both embodiments a temperature within the range of 1450° to 1650°F is preferred. However, when the subsequent reactivation is carried out at essentially room temperature (40° to 150°F), any temperature within the range of 700° to 2000°F, preferably 900° to 1700°F can be used. The calcination is generally carried out for a time within the range of ½ to 50 hours, preferably 2 to 20 hours, thus preparing it for the subsequent impregnation with the $\pi$ bonded organochromium compound.

The $\pi$ bonded organochromium compounds employed in the catalysts of this invention are known in the art. Preferred are the diarene chromium compounds having the following structure

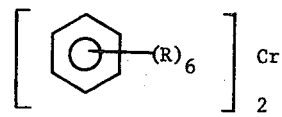

wherein R is selected from the group consisting of hydrogen and alkyl radicals having from 1 to 6 carbon atoms. Examples of these compounds include dibenzene chromium, ditoluene chromium, di-o-xylene chromium, di-p-xylene chromium, dicumene chromium, dimesitylene chromium, di(n-propylbenzene) chromium, di(1,3,5-triethylbenzene)chromium, di(1,3-diethyl-4-hexylbenzene)chromium, di(1,3-dipentylbenzene)chromium, di-(1,3,5-trihexylbenzene)chromium, di(hexamethylbenzene)chromium and the like. It is believed that the chromium in these diarene compounds has a valence of 0, the two organo groups thus being the same or different ligands.

The organochromium compounds are liquids or solids soluble in many organic solvents. Preferred solvents are non-polar liquids at ambient temperatures which are sufficiently volatile to allow removal by evaporation. Examples of suitable solvents include alkanes, cycloalkanes, aromatic hydrocarbons, halogenated compounds, ethers and the like. Exemplary compounds include pentane, n-hexane, decane, cyclohexane, methylcyclohexane, benzene, xylenes, chloroform, diethyl ether, etc., and mixtures of one or more of the pure compounds. A sufficient quantity of a solution of the chromium compound is used to completely wet the support and fill the porous structure to insure even distribution of the chromium compound on the support. Generally, the solutions contain from about 0.002 to about 25 weight percent of the organochromium compound.

A sufficient volume of the solution of the organochromium compound is taken so as to provide from about 0.01 to 30, preferably from 0.1 to 10, most preferably from 0.25 to 1 parts by weight of the organochromium compound per 100 parts by weight of the activated titanium-containing support. The contact between the support and metal solution is effected in a conventional way such as by slurrying and at any convenient temperature. Generally, ambient temperature is used, although temperatures ranging from about the freezing point of the solvent to as high as about 300°F can be employed during the contacting period. Contact times from a few seconds to 76 hours are adequate.

After the contacting operation, the catalyst is reactivated by treatment with oxygen. In the first embodiment, this reactivation is carried out at a relatively low temperature. This treatment, for instance, can be carried out at essentially room temperature or any temperature within the range of 40 to 150, preferably 70° to 100°F. In this embodiment it is essential that there be present at least 2 weight percent solvent based on the weight of the impregnated support. Preferably there will be in the range of 10 to 100, more preferably 15 to 50 weight percent solvent. Within the range of about 10 to 50 weight percent solvent, the impregnated catalyst is a free-flowing powder. At concentrations of solvent of greater than 50 weight percent, the catalyst is visibly wet. The only absolute upper limit is simply the maximum amount of solvent which is convenient to work with since the reactivation can be carried out with sufficient solvent that the catalyst is in a slurry in the solvent. The solvent is generally simply the solvent used to dissolve the organochromium compound as disclosed hereinabove.

The oxygen treatment is preferably carried out by utilizing air although any oxygen-containing atmosphere can be utilized. The critical feature is more the amount of oxygen than the time and temperature so long as the temperature is kept low in this first embodiment. One criterion for determining the proper amount of oxygen is to observe the color of the catalyst in instances where the oxygen is simply introduced into the mixture of support and organochromium solution. The catalyst prior to introducing oxygen is green and turns yellow or orange on introduction of oxygen. Preferably an amount of oxygen is introduced sufficient to turn at least 10 percent of the catalyst orange, and can range up to an amount above that necessary to turn essentially all of the catalyst orange. Preferably about 0.1 to 1 moles of oxygen per mole of chromium is utilized, more preferably about 0.25 to 0.75, most preferably about 0.5 moles of oxygen per mole of chromium.

In the second embodiment, the catalyst base must be calcined initially at a temperature within the range of 1450° to 1650°F after which it is impregnated with the chromium as noted hereinabove and reactivated in the presence of oxygen at a temperature of 40 to 150°F or at a temperature between about 500°–800°F. Thus the temperature for this reactivation is either about room temperature (40 to 150, preferably 70 to 100°F) or is about 500° to 800°F, preferably 600° to 700°F. The essentially room temperature treatment is carried out as described hereinabove with respect to embodiment 1. The reactivation at 500° to 800°F is, of course, carried out on material which is essentially dry since the high temperature will evaporate off the solvent and decompose the organochromium compound. It is preferred to have a substantial excess of air in the 500° to 800°F treatment.

Thus it is most surprising in the first embodiment utilizing essentially room temperature reactivation that relatively low controlled amounts of oxygen are more effective. The amount of air or other oxygen-containing atmosphere is not particularly critical in embodiments utilizing 500° to 800°F reactivation so long as there is 1 or more moles of oxygen per mole of chromium.

The polymers prepared with the catalysts of this invention are normally solid polymers of at least one mono-1-olefin containing from 2 to 8 carbon atoms per molecule. The catalysts of the invention are particularly useful for the preparation of high melt flow ethylene polymers. These preferred polymers are normally solid homopolymers of ethylene or copolymers of ethylene with another mono-1-olefin containing 3 to 8 carbon atoms per molecule. Exemplary copolymers include those of ethylene/propylene, ethylene/1-butene, ethylene/1-hexene, and ethylene/1-octene and the like. The major portion of such copolymers is derived from ethylene and generally consists of about 80–99, preferably 95–99 mole percent of ethylene. These polymers are well suited for extrusion, blow molding, injection molding, and the like.

The polymerization process using the catalyst of this invention is conducted in the gaseous phase or in liquid phase, generally in the presence of an inert hydrocarbon diluent. Suitable diluents are those hydrocarbons having from 3 to 12 carbon atoms per molecule, generally selected from paraffins, cycloparaffins and aromatics with the paraffinic hydrocarbons being more preferred. Preferred diluents include propane, n-butane, isobutane, n-pentane, isopentane, n-hexane, n-heptane, 2,2,4-trimethylpentane, cyclopentane, cyclohexane, methylcyclohexane, n-dodecane and mixtures thereof. It is preferred to have one of the previously mentioned diluents present in the liquid phase to facilitate removal of the heat of reaction. The pressure is generally in the range of 0 to 2000 psig and need be no more than sufficient to maintain the diluent in liquid phase, i.e. 50 to 750 psig.

The reaction in accordance with this invention is generally carried out within the temperature range of 100° to 500°F. Most frequently, the range is from 150° to 350°F since polymer yields are highest within this range. In a presently preferred embodiment, the temperature range is from 150° to 230°F so that the polymer particles form a suspension in the reaction mixture, i.e. particle-form process. At higher temperatures the polymer in most cases forms in solution in the diluent in the reaction zone, i.e. a solution process.

The contacting of monomer or monomers with the catalyst can be effected by any of the techniques known in the art of solid catalysis. A convenient method is to suspend the catalyst in the liquid diluent and to agitate the reaction mixture, thus maintaining the catalyst as a solid suspension in the liquid diluent.

Other known catalytic contacting methods such as fixed bed, fluidized bed, gravitating bed, etc., can also be used. References to production of ethylene polymers according to particle-form process is found in U.S. Pat. No. 3,624,063, the disclosure of which is hereby incorporated by reference.

The particle-form process in which the catalyst of this present invention is particularly applicable is a process in which at least one olefin is polymerized at a temperature within the range of about 150°–230°F by means of the catalyst of the invention. The catalyst is maintained in suspension and is contacted with the olefin or mixture of olefins in an organic medium at pressures sufficient to maintain the medium and at least a portion of the olefins in the liquid phase. The medium and temperature are such that the polymer produced is insoluble in the medium and is recovered in the form of solid particles. The organic medium (nonaqueous diluent) is generally a paraffin and/or cycloparaffin having from 3 to 12 carbon atoms per molecule. Representative examples include propane, butane, isobutane, pentane, isopentane, cyclohexane, n-dodecane, methylcyclohexane and the like. Pressures can range from about 100 to 700 psig or higher, and catalyst concentrations can range from 0.001 to about 1 weight percent based on the weight of the reactor contents. The invention is of particular applicability in producing polymer in a particle-form process at a productivity of greater than 2000 pounds of polymer per pound of catalyst.

Hydrogen can be used to decrease the molecular weight of the polymers produced with the catalyst of this invention if desired (i.e. give a much higher MI). Hydrogen is particularly effective in increasing the melt index of catalysts which are reactivated at essentially room temperature. Partial pressure of hydrogen when hydrogen is used can be within the range of 5 to 100 psig, preferably 25 to 75 psig. The melt indices of the polymers thus produced can range from about 0.1 to about 70 or even higher. With the higher temperature reactivation polymer can be produced having a sufficiently high melt index without the use of hydrogen.

EXAMPLE I

In the following runs, catalysts were prepared from commercial microspheroidal intermediate density silica dried at 300°F in 45 mm quartz activators. It was fluidized in dry air for 3 hours and in nitrogen for 2 hours. The silica was titanated as a slurry in n-hexane with a hexane solution of tetraisopropyl titanate. The base was dried in the absence of moisture over boiling water and calcined at 1500°F in quartz activators for 3 hours in air and 2 hours in nitrogen. The support was then impregnated with the organochromium compound. This was done by taking about 3 grams of the calcined support which was slurried in n-hexane in a 125 cc catalyst flask under a dry nitrogen blanket and a hydrocarbon solution of the chromium compound was added from a syringe while the slurry was swirled. The supernatant liquid was decanted and the mud was dried over hot water with a dry nitrogen purge to the levels indicated. Dry air was then added to give the indicated mole ratio of $O_2/Cr$.

Polymerization was carried out in a stirred reactor equipped with a 3-blade propeller-agitator. Isobutane was the diluent. Reactor temperature control was by an automatic system. Polymerization temperature, hydrogen concentration and ethylene concentration were adjusted in an attempt to obtain a product melt index of 20 to 30. Polymerizations were usually run to 5000 g/g productivities; in case of low catalyst activity, tests were stopped at lower productivities.

Regular and high load melt index of the polymer were obtained on a Slocomb melt index apparatus at 190°C.

TABLE I

The Effect of $O_2/Cr$ ratio and Volatile Matter on the Room Temperature Oxidation of Dibenzene and Dicumene Chromium Catalysts
2.5 PHS Ti on MSID silica dried at 300 F;
calcined at 1500 F; 0.5 PHB Cr
Polymerization: 215 F; 50 psi $H_2$; 550 psig Total,
Isobutane Diluent

| $O_2/Cr$ | Cr Comp'd | Volatile Matter,% | Run Time,min | Prod. g/g | Rate, g/g-hr | M.I. | HLMI/MI |
|---|---|---|---|---|---|---|---|
| 0 | dibenzene | 11 | 60 | 2000 | 2000 | 95 | 43 |
| 1 | dibenzene | 11 | 48 | 5200 | 6500 | 26 | 46 |
| 0.5 | dibenzene | 45.5 | 41 | 5100 | 7400 | 26 | 41 |
| 0.5 | dibenzene | 1.9 | 68 | 3100 | 2700 | 38 | 41 |
| 2 | dibenzene | 45.5 | 48 | 3160 | 3900 | 35 | 44 |
| 0 | dicumene | 37 | 67 | 69 | 62 | — | — |
| 0.5 | dicumene | 45 | 39 | 5100 | 7800 | 27 | 41 |
| 1.5 | dicumene | 45 | 70 | 2875 | 2500 | 45 | 42 |
| 0.5 | dicumene | 39 | 43 | 5000 | 7000 | 37 | 45 |
| 0.5 | dicumene | 1.9* | 63 | 3200 | 3000 | 28 | 46 |

*Room temperature dried as a fluidized bed with nitrogen after oxidizing. This run demonstrates that it is preferred that the catalyst retain at least 2 weight per cent volatile matter (solvent) until it is used.

As can be seen when the catalysts prepared from dibenzene chromium were dried to a free flowing powder over hot water and under a nitrogen blanket, rigorously excluding air, activities of the catalysts in ethylene polymerization were about 2000 g/g/hr. When catalysts were similarly prepared from dicumene chromium, ethylene polymerization activities were less than 100 g/g/hr. The activity in each case was greatly increased by a mild oxidation at room temperature. Since the activities following oxidation were about the same, the difference in activity (2000 vs 69) before oxidation may reflect accidental partial oxidation of the benzene Cr catalyst. Titanium and chromium contents are expressed as parts per hundred of silica (PHS) and parts per hundred of base (PHB), respectively. The activity of room temperature oxidized catalyst was very sensitive to the ratio of oxygen to chromium and to the hydrocarbon content (volatile matter) of the catalyst. As can be seen some oxygen is required for good activity but ratios of $O_2/Cr$ below about 1 gave the best results. Also, the presence of greater than about 2 percent volatiles improved productivity. Similar results were obtained on catalysts prepared from a cogel base (silica coprecipitated with the titanium instead of being impregnated later).

EXAMPLE II

Titanated base was calcined at 1100°F to 1700°F and catalysts were prepared with dibenzene chromium or dicumene chromium. These were tested after room temperature oxidation (about 80°F) and also after 600°F oxidation in air, and were compared as to activity, polymer melt index, and shear response or HLMI/MI ratio. The results are shown in Table II and FIG. 1. Catalysts oxidized by both methods show a peak in activity when the base was calcined at 1500°F. Melt index vs calcining temperature has a maximum at 1500°F for the 600°F oxidized catalysts and 1600°F for the catalysts which were oxidized at room temperature.

TABLE II

The Effect of Base Calcining Temperature on Dibenzene or Dicumene Chromium Catalysts
2.5 PHS Ti on MS silica dried at 300 F; calcined and promoted with 0.5 PHB Cr;
room temperature (R.T.) oxidations at 0.5 $O_2$/Cr; 600 F oxidation with excess air.

| Catalyst Preparation | | | Polymerization | | | | | | |
|---|---|---|---|---|---|---|---|---|---|
| Calcining Temp, F | Oxidation Temp. | Volatile Matter, % | Temp °F | $H_2$psi | Total psi | Run Time, min. | Prod g/g | Rate, g/g-hr | M.I. | HLMI/MI |
| 1100 | R.T. | 39 | 215 | 50 | 550 | 53 | 3230 | 3700 | 18(13)* | 51 |
| 1100 | 600 F | 0 | 210 | 0 | 520 | 83 | 4825 | 3500 | 2 | 87 |
| 1300 | R.T. | 45.6 | 215 | 50 | 550 | 45 | 3175 | 4200 | 28(21)* | 45 |
| 1300 | 600 F | 0 | 210 | 0 | 520 | 50 | 3180 | 3800 | 7(5)* | 76 |
| 1400 | R.T. | 42 | 215 | 50 | 550 | 52 | 3350 | 3900 | 29(23)* | 43 |
| 1400 | 600 F | 0 | 215 | 0 | 550 | 60 | 5310 | 5310 | 16 | 55 |
| 1500 | R.T. | 46 | 215 | 50 | 550 | 41 | 5100 | 7400 | 26 | 41 |
| 1500 | R.T. | 45 | 215 | 50 | 550 | 39 | 5100 | 7800 | 27 | 41 |
| 1500 | 600 F | 0 | 210 | 0 | 520 | 39 | 4825 | 7400 | 25 | 51 |
| 1600 | R.T. | 38 | 215 | 50 | 550 | 72 | 5060 | 4200 | 30 | 46 |
| 1600 | 600 F | 0 | 210 | 0 | 520 | 58 | 4975 | 5100 | 16 | 57 |
| 1700 | R.T. | 30.6 | 215 | 50 | 550 | 77 | 5150 | 4000 | 13 | 56 |
| 1700 | 600 F | 0 | 210 | 0 | 520 | 66 | 5180 | 4710 | 19 | 49 |

*Corrected to 5000 g/g productivity.

While this invention has been described in detail for the purpose of illustration, it is not to be construed as limited thereby but is intended to cover all changes and modifications within the spirit and scope thereof.

I claim:

1. A process for producing a catalyst comprising:
   calcining a silica-containing particulate support containing titanium in air at a temperature within the range of 700° to 2000°F;
   thereafter impregnating the thus calcined titanium-containing support with a nonaqueous solution of a diarene organochromium compound having the following structure

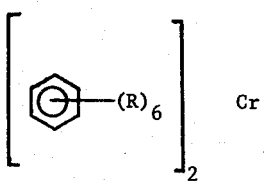

wherein R is selected from the group consisting of hydrogen and alkyl radicals having from 1 to 6 carbon atoms; and
   thereafter treating the thus organochromium-impregnated support in the form of a free flowing powder containing at least 2 weight percent solvent, based on the weight of said impregnated support, with molecular oxygen at a temperature within the range of 40° to 150°F.

2. A method according to claim 1 wherein said organochromium compound is one of dibenzene chromium and dicumene chromium or mixtures thereof and is present in an amount within the range of 0.1 to 10 parts by weight per 100 parts by weight of said activated titanium-containing support, said titanium is present in an amount within the range of 1–8 weight percent based on the weight of said support and said solvent is present in an amount within the range of 15 to 50 weight percent.

3. A method according to claim 1 wherein said support is silica coprecipitated with a titanium compound.

4. A method according to claim 3 wherein said titanium compound coprecipitated with said silica is titanyl sulfate or titanium potassium oxalate.

5. A method according to claim 1 wherein said support is calcined at a temperature within the range of 1450° to 1650°F.

6. A method according to claim 1 wherein said oxygen is supplied in an amount sufficient to give 0.25 to 0.75 moles of oxygen per mole of chromium.

7. A method according to claim 6 wherein said calcination is carried out at a temperature within the range of 1450° to 1650°F, said organochromium compound is one of dibenzene chromium and dicumene chromium or mixtures thereof and is present in an amount within the range of 0.1 to 10 parts by weight per 100 parts by weight of said titanium-containing support, and said titanium is present in an amount within the range of 1 to 8 weight percent based on the weight of said support.

8. A catalyst produced according to the method of claim 7.

9. A catalyst produced according to the method of claim 1.

10. A polymerization process which comprises contacting at least one polymerizable mono-1-olefin having 2–8 carbon atoms per molecule under polymerization conditions with a catalyst produced by the method of claim 1.

11. A process according to claim 10 wherein said olefin is ethylene.

12. A method according to claim 10 wherein said contacting is carried out in a liquid diluent at a temperature such that at least a substantial part of polymer produced is insoluble in said diluent.

13. A method according to claim 10 wherein said contacting is carried out at a temperature within the range of 150° to 230°F and substantially all polymer produced is in particle form.

14. A method according to claim 10 wherein said contacting is carried out in a liquid diluent selected from paraffins or cycloparaffins or mixtures thereof having 3 to 12 carbon atoms per molecule.

15. A method according to claim 14 wherein said diluent is selected from the group consisting of propane, isobutane, cyclohexane, n-dodecane, and methylcyclohexane.

16. A method according to claim 15 wherein said diluent is isobutane.

17. A process for producing a catalyst comprising:
calcining in air a silica-containing particulate support containing titanium at a temperature within the range of 1450 to 1650°F;
thereafter impregnating the thus calcined titanium-containing support with a nonaqueous solution of a π bonded organochromium compound; and
thereafter treating the thus organochromium-impregnated support with molecular oxygen at a temperature within the range of 40°–150°F.

18. A method according to claim 17 wherein said organochromium compound is a diarene chromium having the following structure

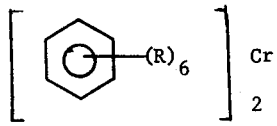

wherein R is selected from the group consisting of hydrogen and alkyl radicals having from 1 to 6 carbon atoms.

19. A method according to claim 17 wherein said organochromium compound is one of dibenzene chromium and dicumene chromium or mixtures thereof and is present in an amount within the range of 0.1 to 10 parts by weight per 100 parts by weight of said activated titanium-containing support, and said titanium is present in an amount within the range of 1–8 weight percent based on the weight of said support.

20. A method according to claim 17 wherein said support is silica coprecipitated with a titanium compound.

21. A method according to claim 17 wherein said treatment with oxygen is carried out at about room temperature.

22. A method according to claim 17 wherein said oxygen is supplied in an amount within the range of 0.25 to 0.75 moles per mole of said chromium.

23. A catalyst according to claim 22.

24. A method according to claim 17 wherein said oxygen is present in an amount greater than 1 mole per mole of said chromium.

25. A catalyst produced by the method of claim 24.

26. A polymerization process which comprises contacting at least one polymerizable mono-1-olefin having 2–8 carbon atoms per molecule under polymerization conditions with a catalyst produced by the method of claim 17.

27. A process according to claim 26 wherein said olefin is ethylene.

28. A method according to claim 26 wherein said contacting is carried out in a liquid diluent at a temperature such that at least a substantial part of polymer produced is insoluble in said diluent.

29. A method according to claim 26 wherein said contacting is carried out at a temperature within the range of 150° to 230°F and substantially all polymer produced is in particle form.

30. A method according to claim 26 wherein said contacting is carried out in a liquid diluent selected from paraffins or cycloparaffins or mixtures thereof having 3 to 12 carbon atoms per molecule.

31. A method according to claim 30 wherein said diluent is selected from the group consisting of propane, isobutane, cyclohexane, n-dodecane, and methylcyclohexane.

* * * * *

UNITED STATES PATENT AND TRADEMARK OFFICE
CERTIFICATE OF CORRECTION

PATENT NO. : 3,976,632
DATED : August 24, 1976
INVENTOR(S) : Joseph A. Delap

It is certified that error appears in the above-identified patent and that said Letters Patent are hereby corrected as shown below:

Column 10, line 40, before "* * * *" insert the following:

32. A method according to claim 31 wherein said diluent is isobutane.

Signed and Sealed this

Twenty-first Day of December 1976

[SEAL]

Attest:

RUTH C. MASON
*Attesting Officer*

C. MARSHALL DANN
*Commissioner of Patents and Trademarks*